US012584270B2

(12) United States Patent
Shibano et al.

(10) Patent No.: US 12,584,270 B2
(45) Date of Patent: Mar. 24, 2026

(54) ARTIFICIAL LEATHER AND METHOD FOR MANUFACTURING SAME

(71) Applicant: Toray Industries, Inc., Tokyo (JP)

(72) Inventors: Takuya Shibano, Otsu (JP); Shunichi Kimura, Gifu (JP); Satoshi Yanagisawa, Gifu (JP); Yukihiro Matsuzaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 302 days.

(21) Appl. No.: 18/037,421

(22) PCT Filed: Nov. 25, 2021

(86) PCT No.: PCT/JP2021/043125
§ 371 (c)(1),
(2) Date: May 17, 2023

(87) PCT Pub. No.: WO2022/114041
PCT Pub. Date: Jun. 2, 2022

(65) Prior Publication Data

US 2023/0407558 A1 Dec. 21, 2023

(30) Foreign Application Priority Data

Nov. 30, 2020 (JP) ................................ 2020-197983

(51) Int. Cl.

| | |
|---|---|
| ***D06M 15/568*** | (2006.01) |
| ***C08J 5/24*** | (2006.01) |
| ***C08L 75/08*** | (2006.01) |
| ***D04H 1/435*** | (2012.01) |
| ***D04H 1/4382*** | (2012.01) |
| ***D04H 1/46*** | (2012.01) |
| ***D06B 21/00*** | (2006.01) |
| ***D06C 11/00*** | (2006.01) |
| ***D06M 15/333*** | (2006.01) |
| ***D06M 101/32*** | (2006.01) |

(52) U.S. Cl.
CPC ........... *D06M 15/568* (2013.01); *C08J 5/246* (2021.05); *C08L 75/08* (2013.01); *D04H 1/435* (2013.01); *D04H 1/4383* (2020.05); *D04H 1/46* (2013.01); *D06B 21/00* (2013.01); *D06C 11/00* (2013.01); *D06M 15/333* (2013.01); *C08J 2367/02* (2013.01); *C08J 2375/08* (2013.01); *C08L 2205/16* (2013.01); *D06M 2101/32* (2013.01)

(58) Field of Classification Search
CPC ............ D06M 15/568; D06M 15/333; D06M 2101/32; D06M 2211/28; D06N 3/004; D06N 3/04; D06N 3/0011; D06N 3/14; D06N 3/146; D06N 2203/068; D04H 1/4384; D04H 1/46; D04H 1/435; C08J 5/246; C08J 2367/02; C08J 2375/08; C08L 75/08; C08L 2205/16; D06B 21/00; D06C 11/00
USPC .......................................................... 442/60
See application file for complete search history.

(56) References Cited

U.S. PATENT DOCUMENTS

| | | | | |
|---|---|---|---|---|
| 3,989,869 | A | 11/1976 | Neumaier et al. | |
| 4,233,359 | A | 11/1980 | Mimura et al. | |
| 4,264,645 | A | 4/1981 | von Bonin et al. | |
| 2017/0350069 | A1 * | 12/2017 | Nakai ................ | D06M 15/564 |
| 2020/0095725 | A1 | 3/2020 | Furui et al. | |
| 2020/0149216 | A1 | 5/2020 | Murahara et al. | |

FOREIGN PATENT DOCUMENTS

| | | | |
|---|---|---|---|
| JP | 5052397 | A | 5/1975 |
| JP | 4812179 | B1 | 4/1977 |
| JP | 5466961 | A | 5/1979 |
| JP | 5468498 | A | 6/1979 |
| JP | 06220399 | A | 8/1994 |
| JP | 2014065980 | A | 4/2014 |
| JP | 2019112742 | A | 7/2019 |
| TW | 202030937 | * | 8/2020 |
| WO | 2015129602 | A1 | 9/2015 |
| WO | 2018181319 | A1 | 10/2018 |
| WO | 2019025964 | A1 | 2/2019 |

OTHER PUBLICATIONS

HyFabric Supply, Polyester Fibers, Jul. 28, 2025 (Year: 2025).*
HyFabric Supply, Polyester Fiber, accessed online Nov. 4, 2025.*
International Search Report and Written Opinion for International Application No. PCT/JP2021/043125, dated Feb. 8, 2022, 7 pages.

* cited by examiner

*Primary Examiner* — Camie S Thompson
(74) *Attorney, Agent, or Firm* — Buchanan Ingersoll & Rooney PC

(57) ABSTRACT

Provided is an artificial leather that achieves both a soft texture and excellent durability, and a method for manufacturing the same, the leather comprising: a fibrous base material formed from superfine fibers having an average single fiber diameter of 0.1-10 μm; and a polymeric elastic body, where the polymer elastic body comprises a compound having a hydrophilic group and a compound having an ethylene oxide skeleton, the content of the compound in the polymeric elastic body of the artificial leather being 0.1-5 parts by mass per 100 parts by mass of the polymeric elastic body.

3 Claims, No Drawings

ARTIFICIAL LEATHER AND METHOD FOR MANUFACTURING SAME

CROSS REFERENCE TO RELATED APPLICATIONS

This application is the U.S. National Phase of PCT/JP2021/043125, filed Nov. 25, 2021, which claims priority to Japanese Patent Application No. 2020-197983, filed Nov. 30, 2020, the disclosures of these applications being incorporated herein by reference in their entireties for all purposes.

FIELD OF THE INVENTION

The present invention relates to an artificial leather that achieves both a soft texture and excellent durability, and also relates to a method for manufacturing the same.

BACKGROUND OF THE INVENTION

Artificial leathers made of a fibrous substrate such as a nonwoven fabric and polyurethane have excellent characteristics that natural leathers do not have, and have been spreading year by year in clothing, chair upholstery, automobile interior material applications, and the like. Regarding polyurethane in the artificial leather, a method for using not organic solvent-based polyurethane but water-dispersed polyurethane in which a polyurethane resin is dispersed in water has been studied from the viewpoint of environmental conservation.

Coagulation of water-dispersed polyurethane is mainly performed by a so-called steam coagulation method in which a hydration state of a polyurethane dispersion is collapsed by heating to aggregate polyurethane emulsions. However, in the steam coagulation method, a phenomenon in which particles of a polyurethane emulsion dispersed in water intensively adhere to a surface layer of artificial leather by being attracted to movement of water, a so-called migration phenomenon occurs. Therefore, adhesion between the fibrous substrate and the polyurethane becomes dense, and the entangled portion of the fiber is strongly gripped, so that the texture becomes hard.

In order to obtain an artificial leather having a soft texture using water-dispersed polyurethane, for example, a method has been proposed in which a thickener is added to a polyurethane dispersion to increase the viscosity of the polyurethane dispersion, suppress the movement of a polyurethane emulsion to a surface layer of the artificial leather, and obtain a soft texture (refer to Patent Documents 1 to 4).

PATENT DOCUMENTS

Patent Document 1: International Publication No. 2019/025964

Patent Document 2: Japanese Patent Laid-open Publication No. 2014-065980

Patent Document 3: Japanese Patent Laid-open Publication No. 2019-112742

Patent Document 4: International Publication No. 2015/129602

SUMMARY OF THE INVENTION

However, in the method using water-dispersed polyurethane, it is difficult to completely suppress the migration phenomenon, and the polyurethane is unevenly distributed in the artificial leather surface layer, so that flexibility is poor as compared with the method using organic solvent-based polyurethane. In addition, since the polyurethane is unevenly distributed in the artificial leather surface layer, there is a problem that the chance of coming into contact with moisture in the air increases, and the polyurethane is hydrolyzed and easily deteriorated over time.

In the method disclosed in Patent Document 1, in a polyvinyl alcohol impregnation step before imparting water-dispersed polyurethane, adhesion between fibers and polyurethane is reduced by simultaneously impregnating an organic salt or an inorganic salt with polyvinyl alcohol, but abrasion resistance and durability are insufficient because polyurethane has a weak force to grip the fiber.

In the method disclosed in Patent Document 2, the coagulation of the polyurethane is accelerated by the addition of an ammonium salt, but since the ammonium salt is contained in the polyurethane, the film properties of the polyurethane are deteriorated, and a repulsive feeling is insufficient for an artificial leather using organic solvent-based polyurethane.

In the method disclosed in Patent Document 3, a thickener made of a polysaccharide is applied to make polyurethane porous, but since the viscosity of the prepared liquid of the water-dispersed polyurethane is low, it cannot be said that the migration phenomenon can be sufficiently suppressed, and flexibility and durability are insufficient.

In the method disclosed in Patent Document 4, in polyurethane coagulation in hot water, since the polyurethane has a weak force to grip the fiber, abrasion resistance and durability are insufficient.

Therefore, in view of the background of the related art described above, it is an object of the present invention to provide an artificial leather that not only can be manufactured in consideration of the environment, but also has both a soft texture and excellent durability, and a method for manufacturing the artificial leather.

That is, the present invention solves the above problems, and an artificial leather of the present invention includes a fibrous substrate formed of ultrafine fibers having an average single fiber diameter of 0.1 μm or more and 10 μm or less; and an elastomer, wherein the elastomer contains a compound having a hydrophilic group and a compound having an ethylene oxide skeleton represented by general formula (1) as below, and a content of the compound having the ethylene oxide skeleton in the elastomer of the artificial leather is 0.1 parts by mass or more and 5 parts by mass or less per 100 parts by mass of the elastomer.

[Chemical formula 1]

$$R^1\text{-}(\text{-}CH_2CH_2\text{-})_n R^2 \qquad (1)$$

Here, $R^1$ and $R^2$ are functional groups having 1 to 20 carbon atoms, and n represents the number of repeating units of 10 or more and 200 or less.

According to a preferred embodiment of the artificial leather of the present invention, $R^1$ in the general formula (1) is a functional group having an ester bond represented by general formula (2).

[Chemical formula 2]

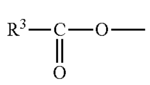

(2)

Here, $R^3$ is an alkyl group having 1 to 19 carbon atoms and an aryl group having 1 to 19 carbon atoms.

According to a preferred embodiment of the artificial leather of the present invention, $R^3$ in the general formula (2) is a functional group containing a terminal group selected from the group consisting of an isopropyl group, a tert-butyl group, and a mesityl group.

A method for manufacturing an artificial leather according to the present invention including:

impregnating a fibrous substrate made of ultrafine fiber-generating fibers and ultrafine fibers with an aqueous dispersion containing an elastomer precursor having a hydrophilic group and 0.1 parts by mass or more and 5 parts by mass or less of a compound having an ethylene oxide skeleton represented by the general formula (1) with respect to 100 parts by mass of a solid content of the elastomer precursor; and coagulating the elastomer precursor.

According to a preferred aspect of the method for manufacturing an artificial leather of the present invention, the viscosity of the aqueous dispersion is 1000 mPa·s or more and 10,000 mPa·s or less.

According to the present invention, an artificial leather having both soft texture and excellent durability is obtained.

DETAILED DESCRIPTION OF EMBODIMENTS OF THE INVENTION

The artificial leather of the present invention includes a fibrous substrate formed of ultrafine fibers having an average single fiber diameter of 0.1 μm or more and 10 μm or less; and an elastomer, wherein the elastomer contains a compound having a hydrophilic group and a compound having an ethylene oxide skeleton represented by general formula (1) as below, and a content of the compound having the ethylene oxide skeleton in the elastomer of the artificial leather is 0.1 parts by mass or more and 5 parts by mass or less per 100 parts by mass of the elastomer.

[Chemical formula 3]

$$R^1\text{-}(\text{-}CH_2CH_2\text{-})_n\text{-}R^2 \quad (1)$$

Here, $R^1$ and $R^2$ are compounds having 1 to 20 carbon atoms, and n represents the number of repeating units of 10 or more and 200 or less.

Hereinafter, this constituent element will be described in detail, but the present invention is not limited to the scope described below at all as long as it is not beyond the gist of the present invention.

[Ultrafine Fiber]

Examples of the resin that can be used for the ultrafine fiber used in the present invention include a polyester-based resin and a polyamide-based resin from the viewpoint of excellent durability, particularly, mechanical strength, heat resistance, and light resistance.

Specific examples of the polyester-based resin include polyethylene terephthalate, polybutylene terephthalate, and polytrimethylene terephthalate. The polyester-based resin can be obtained from, for example, a dicarboxylic acid and/or an ester-forming derivative thereof and a diol.

Examples of the dicarboxylic acid and/or the ester-forming derivative thereof used for the polyester-based resin include terephthalic acid, isophthalic acid, 2,6-naphthalenedicarboxylic acid, diphenyl-4,4'-dicarboxylic acid, and an ester-forming derivative thereof. Note that the ester-forming derivative referred in the present invention is lower alkyl ester of dicarboxylic acid, acid anhydride, acyl chloride, and the like. Specifically, methyl esters, ethyl esters, hydroxyethyl esters, and the like are preferably used. Examples of the dicarboxylic acid and/or ester-forming derivative thereof according to a preferable aspect of the invention include terephthalic acid and/or a dimethyl ester thereof.

Examples of the diol used in the polyester-based resin include ethylene glycol, 1,3-propanediol, 1,4-butanediol, and cyclohexanedimethanol. Among them, ethylene glycol is preferably used.

When a polyamide-based resin is used as the resin used for the ultrafine fiber, polyamide 6, polyamide 66, polyamide 56, polyamide 610, polyamide 11, polyamide 12, copolymerized polyamide, and the like can be used.

Inorganic particles such as titanium oxide particles, a lubricant, a pigment, a thermal stabilizer, a UV absorber, a conductive agent, a heat storage agent, an antibacterial agent, and the like can be contained in the resin that can be used for the ultrafine fiber according to various purposes.

As a cross-sectional shape of the ultrafine fiber, either a round cross section or a modified cross section can be adopted. Specific examples of the modified cross section include an elliptical shape, a flat shape, a polygonal shape such as a triangular shape, a fan-like shape, and a cross shape.

In the present invention, it is important that the average single fiber diameter of the ultrafine fibers is 0.1 μm or more and 10 μm or less. When the average single fiber diameter of the ultrafine fibers is 10 μm or less, preferably 7 μm or less, and more preferably 5 μm or less, it is possible to cause the artificial leather to be softer. In addition, the quality of nap can be improved. Meanwhile, when the average single fiber diameter of the ultrafine fibers is 0.1 μm or more, preferably 0.3 μm or more, and more preferably 0.7 μm or more, it is possible to obtain an artificial leather excellent in color developability after dyeing in a case of color development. Further, when performing a nap raising treatment by buffing, bundled ultrafine fibers can be easy to disperse and handle.

As used herein, the average single fiber diameter can be measured by the following method. That is:

(1) A cross section of the obtained artificial leather cut in the thickness direction is observed with a scanning electron microscope (SEM).

(2) The fiber diameters of any 50 ultrafine fibers in the observation plane with respect to 3 sites on each ultrafine fiber cross section are measured. Provided that in the case of utilizing ultrafine fibers with a modified cross section, the cross-section area of single fiber is measured and the diameter of a circle corresponding to the cross-section area is calculated using the following equation. The obtained diameter is defined as the single fiber diameter of the single fiber.

$$\text{Single fiber diameter } (\mu m) = (4\times(\text{Cross-section area } (\mu cm^2) \text{ of single fiber})/\pi)^{1/2}$$

(3) The total of the diameters obtained at 150 points is averaged and the arithmetic mean value (μm) is rounded off to the first decimal place.

[Fibrous Substrate]

The fibrous substrate used in the present invention is made of the ultrafine fiber. In this regard, it is allowed that the ultrafine fibers of different raw materials are mixed in the fibrous substrate.

As a specific form of the above fibrous substrate, it is possible to use a nonwoven fabric in which the above ultrafine fibers are interlaced or a nonwoven fabric in which fiber bundles of ultrafine fibers are interlaced. Among them, a nonwoven fabric in which fiber bundles of ultrafine fibers are interlaced is preferably used, from the viewpoints of the strength and texture of an artificial leather. From the viewpoints of flexibility and texture, it is particularly preferable to use a nonwoven fabric in which ultrafine fibers constituting fiber bundles of ultrafine fibers are appropriately spaced from one another to form spaces. As described above, the nonwoven fabric, in which fiber bundles of ultrafine fibers are interlaced, may be obtained by, for example, beforehand interlacing ultrafine fiber-generating fibers and then generating ultrafine fibers. Further, the nonwoven fabric, in which ultrafine fibers constituting fiber bundles of the ultrafine fibers are appropriately spaced from one another to form spaces, can be obtained by, for example, using sea-island composite fibers in which a sea component may be removed to make a space between island components.

The nonwoven fabric may be either a short fiber nonwoven fabric or a long fiber nonwoven fabric. From the viewpoint of the texture and quality of the artificial leather, the short fiber nonwoven fabric is more preferably used.

The fiber length of the short fibers in the case of using the short fiber nonwoven fabric is preferably in a range of 25 mm or more and 90 mm or less. When the fiber length is 25 mm or longer, more preferably 35 mm or longer, and still more preferably 40 mm or longer, an artificial leather with excellent abrasion resistance can be easily obtained by interlacing. Further, the fiber length is set to mm or less, more preferably 80 mm or less, and still more preferably 70 mm or less, so that it is possible to obtain an artificial leather having more excellent texture and quality.

In the present invention, when a nonwoven fabric is used as the fibrous substrate, a woven fabric or a knitted fabric may be inserted into or stacked on the nonwoven fabric, or the nonwoven fabric may be lined with a woven fabric or a knitted fabric, for the purpose of improving strength or the like. The average single fiber diameter of the fibers constituting the woven fabric and the knitted fabric is more preferably 0.3 μm or more and 10 μm or less, because damage during needle punching can be reduced and the strength can be maintained.

As the fibers constituting the woven fabric or knitted fabric, it is possible to use a polyester such as polyethylene terephthalate, polybutylene terephthalate, polytrimethylene terephthalate, or polylactic acid, a synthetic fiber such as a polyamide such as polyamide 6 or polyamide 66, a regenerated fiber such as a cellulosic polymer, or a natural fiber such as cotton or hemp.

[Elastomer]

Next, the artificial leather of the present invention has an elastomer. The elastomer includes a “compound having a hydrophilic group” formed by coagulation of an elastomer precursor having a hydrophilic group as described later, and a compound having an ethylene oxide skeleton as described later. Hereinafter, this detail will be further described.

(1) Elastomer Precursor

First, the elastomer precursor according to the present invention has a hydrophilic group. In the present invention, the phrase “having a hydrophilic group” refers to “having a group having active hydrogen”. Specific examples of the group having active hydrogen include a hydroxyl group, a carboxyl group, a sulfonic acid group, and an amino group.

Examples of the elastomer precursor include water-dispersed silicone resins, water-dispersed acrylic resins, water-dispersed polyurethane resins, and copolymers thereof. Among them, water-dispersed polyurethane resins are preferably used from the viewpoint of texture. In particular, a water-dispersed polyurethane resin prepared by reacting polymeric polyol described below, organic diisocyanate, and an active hydrogen component-containing compound having a hydrophilic group to form a hydrophilic prepolymer, and then adding and reacting a chain extender is more preferably used. Hereinafter, these will be described in detail.

(1-1) Polymeric Polyol

Examples of the polymeric polyol preferably used in the present invention include polyether-based polyol, polyester-based polyol, and polycarbonate-based polyol.

Examples of the polyether-based polyol include polyols obtained by adding and polymerizing a monomer such as ethylene oxide, propylene oxide, butylene oxide, styrene oxide, tetrahydrofuran, epichlorohydrin, or cyclohexylene using a polyhydric alcohol or a polyamine as an initiator, and polyols obtained by ring-opening polymerization of the monomer using a protic acid, a Lewis acid, a cationic catalyst, or the like as a catalyst. Specific examples thereof include polyethylene glycol, polypropylene glycol, polytetramethylene glycol, and copolymerized polyol obtained by combining these glycols.

Next, examples of the polyester-based polyol include polyester polyols obtained by condensing various low-molecular-weight polyols with a polybasic acid, and polyols obtained by ring-opening polymerization of lactones.

Examples of low-molecular-weight polyols used for polyester-based polyols include one or more selected from linear alkylene glycols such as “ethylene glycol, 1,3-propylene glycol, 1,4-butanediol, 1,5-pentanediol, 1,6-hexanediol, 1,7-heptanediol, 1.8-octanediol, 1,9-nonanediol, and 1,10-decanediol”; branched alkylene glycols such as “neopentyl glycol, 3-methyl-1,5-pentanediol, 2,4-diethyl-1,5-pentanediol, and 2-methyl-1,8-octanediol”; alicyclic diols such as 1,4-cyclohexanediol; and aromatic dihydric alcohols such as 1,4-bis(β-hydroxyethoxy)benzene. Adducts obtained by adding various alkylene oxides to bisphenol A can also be used as low-molecular-weight polyols.

Examples of the polybasic acid used for polyester-based polyol include one or more selected from the group consisting of succinic acid, maleic acid, adipic acid, glutaric acid, pimelic acid, suberic acid, azelaic acid, sebacic acid, dodecanedicarboxylic acid, phthalic acid, isophthalic acid, terephthalic acid, and hexahydroisophthalic acid.

Further, examples of the polycarbonate-based polyol include compounds obtained by reacting polyol with a carbonate compound such as polyol and dialkyl carbonate or polyol and diaryl carbonate.

As the polyol used for the polycarbonate-based polyol, a low-molecular-weight polyol used for the polyester-based polyol can be used. Meanwhile, as the dialkyl carbonate, dimethyl carbonate, diethyl carbonate, or the like can be used, and as the diaryl carbonate, diphenyl carbonate or the like can be listed.

The number average molecular weight of the polymeric polyol preferably used in the present invention is preferably 500 or more and 5,000 or less. The number average molecular weight of the polymeric polyol is set to 500 or more, and more preferably 1500 or more, so that it is possible to easily prevent the texture of the artificial leather from becoming hard. Further, the number average molecular weight is set to 5,000 or less, and more preferably 4,000 or less, so that it is possible to easily maintain the strength of the polyurethane as a binder.

(1-2) Organic Diisocyanate

Examples of the organic diisocyanate preferably used in the present invention include an aromatic diisocyanate having 6 to 20 carbon atoms (excluding carbon atoms in an NCO group; the same applies to the following), an aliphatic diisocyanate having 2 to 18 carbon atoms, an alicyclic diisocyanate having 4 to 15 carbon atoms, an aroaliphatic diisocyanate having 8 to 15 carbon atoms, a modified product of these diisocyanates (such as a carbodiimide-modified product, a urethane-modified product, and a uretdione-modified product), or a mixture of two or more kinds thereof.

Specific examples of the aromatic diisocyanate having 6 to 20 carbon atoms include 1,3- and/or 1,4-phenylene diisocyanate, 2,4- and/or 2,6-tolylene diisocyanate, 2,4'- and/or 4,4'-diphenylmethane diisocyanate (hereinafter, abbreviated as MDI), 4,4'-diisocyanatobiphenyl, 3,3'-dimethyl-4,4'-diisocyanatobiphenyl, 3,3'-dimethyl-4,4'-diisocyanatodiphenylmethane, and 1,5-naphthylene diisocyanate.

Specific examples of the aliphatic diisocyanate having 2 to 18 carbon atoms include ethylene diisocyanate, tetramethylene diisocyanate, hexamethylene diisocyanate, dodecamethylene diisocyanate, 2,2,4-trimethylhexamethylene diisocyanate, lysine diisocyanate, 2,6-diisocyanatomethylcaproate, bis(2-isocyanatoethyl) carbonate, and 2-isocyanatoethyl-2,6-diisocyanatohexaate.

Specific examples of the alicyclic diisocyanate having 4 to 15 carbon atoms include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylate, and 2,5- and/or 2,6-norbornane diisocyanate.

Specific examples of the aroaliphatic diisocyanate having 8 to 15 carbon atoms include m- and/or p-xylylene diisocyanate, and α,α,α',α'-tetramethylxylylene diisocyanate.

Among them, a preferred organic diisocyanate is an alicyclic diisocyanate. A particularly preferred organic diisocyanate is dicyclohexylmethane-4,4'-diisocyanate (hydrogenated MDI).

(1-3) Active Hydrogen Component-Containing Compound Having Hydrophilic Group

Examples of the active hydrogen component-containing compound having a hydrophilic group preferably used in the present invention include a compound containing a nonionic group and/or an anionic group and/or a cationic group and active hydrogen. The active hydrogen component-containing compound having a hydrophilic group can also be used in the form of salt neutralized with a neutralizer. By using this active hydrogen component-containing compound having a hydrophilic group, the stability of the aqueous dispersion used in the method for manufacturing an artificial leather can be enhanced.

Examples of the compound having a nonionic group and active hydrogen include compounds containing two or more active hydrogen components or two or more isocyanate groups and having a polyoxyethylene glycol group with a molecular weight of 250 to 9,000 or the like in a side chain, and triols such as trimethylol propane and trimethylol butane.

Examples of the compound having an anionic group and active hydrogen include carboxyl group-containing compounds such as 2,2-dimethylol propionic acid, 2,2-dimethylol butanoic acid and 2,2-dimethylol valeric acid and derivatives thereof, sulfonic group-containing compounds such as 1,3-phenylenediamine-4,6-disulfonic acid and 3-(2,3-dihydroxypropoxy)-1-propanesulfonic acid and derivatives thereof, and salts obtained by neutralizing these compounds with a neutralizer.

Examples of the compound containing a cationic group and active hydrogen include tertiary amino group-containing compounds such as 3-dimethylaminopropanol, N-methyldiethanolamine, and N-propyldiethanolamine, and derivatives thereof.

(1-4) Chain Extender

Examples of the chain extender preferably used in the present invention include water, a low-molecular-weight diol such as "ethylene glycol, propylene glycol, 1,3-butylene glycol, 1,4-butanediol, 1,6-hexanediol, diethylene glycol, or neopentyl glycol", an alicyclic diol such as "1,4-bis(hydroxymethyl)cyclohexane", an aromatic diol such as "1,4-bis(hydroxyethyl)benzene", an aliphatic diamine such as "ethylenediamine", an alicyclic diamine such as "isophoronediamine", an aromatic diamine such as "4-4-diaminodiphenylmethane", an aroaliphatic diamine such as "xylenediamine", an alkanolamine such as "ethanolamine", hydrazine, a dihydrazide such as "adipic acid dihydrazide", and a mixture of two or more kinds thereof.

Among them, preferred chain extenders are water, low molecular weight diols, aromatic diamines, and aliphatic diamine, and more preferred examples thereof include water, ethylene glycol, 1,4-butanediol, 4,4'-diaminodiphenylmethane, ethylenediamine, and a mixture of two or more kinds thereof.

(1-5) Structure of Water-Dispersed Polyurethane Resin

As described above, the water-dispersed polyurethane resin preferably used in the present invention is prepared by reacting polymeric polyol described above, organic diisocyanate, and an active hydrogen component-containing compound having a hydrophilic group to form a hydrophilic prepolymer, and then adding and reacting a chain extender is more preferably used.

(1-6) Configuration of Elastomer Precursor

The elastomer precursor preferably contains polyether diol and/or polycarbonate diol as a constituent from the viewpoint of hydrolysis resistance. When the elastomer precursor contains the polyether diol as a constituent, the elastomer precursor has a high degree of freedom of the ether bond, so that the elastomer has a low glass transition temperature and weak cohesive force, and thus has excellent flexibility. On the other hand, by containing polycarbonate diol as a constituent, an elastomer excellent in water resistance, heat resistance, weather resistance, and mechanical properties can be obtained due to the high cohesive force of the carbonate group.

The number average molecular weight of the elastomer precursor used in the present invention is preferably 20,000 or more and 500,000 or less. When it is 20,000 or more, and more preferably 30,000 or more, the strength of the elastomer can be increased. On the other hand, when the content is 500,000 or less, and more preferably 150,000 or less, the viscosity stability can be enhanced, and the workability can be improved.

The number average molecular weight of the elastomer precursor can be determined by gel permeation chromatography (GPC), and is measured under, for example, the following conditions:

Instrument: HLC-8220, manufactured by Tosoh Corporation

Column: TSKgel α-M, manufactured by Tosoh Corporation

Solvent: N,N-dimethylformamide (DMF)

Temperature: 40° C.

Calibration: polystyrene (2) Compound Having Ethylene Oxide Skeleton

When the artificial leather of the present invention is manufactured, it is important to add a compound having an ethylene oxide skeleton to a solution for forming an elastomer. In addition, if necessary, various stabilizers such as a colorant (titanium oxide, carbon black, or the like), an ultraviolet absorber (a benzophenone-based, benzotriazole-based UV absorber, or the like), and an antioxidant [hindered phenols such as 4,4-butylidene-bis(3-methyl-6-1-butylphenol); organic phosphites such as triphenylphosphite and trichloroethylphosphite]; an inorganic filler (calcium carbonate or the like), a crosslinking agent (a carbodiimide crosslinking agent or a blocked isocyanate crosslinking agent), a thickener (a urethane-modified polyether, an acrylic polymer, or the like), and the like can be contained in the solution for forming an elastomer. Hereinafter, the compound having an ethylene oxide skeleton will be described in detail.

In the artificial leather of the present invention, the elastomer contains the compound having a hydrophilic group and a compound having an ethylene oxide skeleton represented by the following general formula (1).

[Chemical formula 4]

$$R^1{-}(-CH_2CH_2-)_n{-}R^2 \quad (1)$$

Here, $R^1$ and $R^2$ are functional groups having 1 to 20 carbon atoms, and n represents the number of repeating units of 10 or more and 200 or less. Then, in the process of manufacturing the artificial leather, a compound having an ethylene oxide skeleton represented by the general formula (1) is contained in a solution for forming an elastomer.

Specific examples of $R^1$ and $R^2$ in the general formula (1) include an alkyl group having 1 to 20 carbon atoms, an aryl group having 1 to 20 carbon atoms, a carbonyl group having 1 to 20 carbon atoms, an ether group having 1 to 20 carbon atoms, a carboxyl group, a functional group having an ester bond to an alkyl group having 1 to 20 carbon atoms or an aryl group having 1 to 20 carbon atoms, and a functional group having a peptide bond to an alkyl group having 1 to 20 carbon atoms or an aryl group having 1 to 20 carbon atoms. In addition, in various functional groups, not only linear functional groups but also functional groups containing the above-described functional groups as side chains may be used.

Among them, $R^1$ in the general formula (1) is preferably a functional group having an ester bond represented by the general formula (2).

[Chemical formula 5]

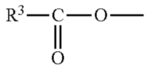

(2)

Here, $R^3$ is an alkyl group having 1 to 19 carbon atoms and an aryl group having 1 to 19 carbon atoms. By using the compound having an ester bond, various side chains can be imparted to the compound having an ethylene oxide skeleton, and characteristics suitable for the purpose can be imparted.

In particular, in the present invention, $R^3$ in the general formula (2) is preferably a functional group containing a terminal group selected from the group consisting of an isopropyl group, a tert-butyl group, and a mesityl group. By having these functional groups, the restriction of the molecular chain is increased, and it is possible to contribute to the improvement of the durability of the elastomer that grips the ultrafine fiber in the artificial leather.

Furthermore, n in the general formula (1) is preferably the number of repeating units of 10 or more and 200 or less. By setting n to the number of repeating units of 10 or more, more preferably 15 or more, moisture in the air can be selectively adsorbed, so that deterioration of the elastomer that deteriorates over time in actual use can be suppressed. By setting n to the number of repeating units of 200 or less, more preferably 150 or less, compatibility with the elastomer precursor can be improved, and inhibition of coagulation of the elastomer can be suppressed.

The solution viscosity of the compound having an ethylene oxide skeleton when dissolved in water is preferably 500 mPa·s or more and 10,000 mPa·s or less. By setting the solution viscosity to 500 mPa·s or more, more preferably 1,000 mPa·s or more, the number of repeating units described above can be achieved, and deterioration of the elastomer that deteriorates over time in actual use can be suppressed. On the other hand, by setting the solution viscosity to 10,000 mPa·s or less, more preferably 9,000 mPa·s or less, the number of repeating units can be set to the above-described number, compatibility with the elastomer precursor can be improved, and inhibition of coagulation of the elastomer can be suppressed.

The number average molecular weight of the compound having an ethylene oxide skeleton added to the aqueous dispersion in which the elastomer precursor is dispersed in water is preferably 500 or more and 10,000 or less. By setting the number average molecular weight to 500 or more, more preferably 800 or more, the number of repeating units described above can be set, and deterioration of the elastomer that deteriorates over time in actual use can be suppressed. On the other hand, by setting the number average molecular weight to 10,000 or less, more preferably 9,000 or less, the number of repeating units can be set to the above-described number, compatibility with the elastomer precursor can be improved, and inhibition of coagulation of the elastomer can be suppressed.

The number average molecular weight of the compound having an ethylene oxide skeleton can be measured in the same manner as the number average molecular weight of the elastomer precursor.

The content of the compound having an ethylene oxide skeleton added to the aqueous dispersion is preferably 0.1 parts by mass or more and 5 parts by mass or less with respect to 100 parts by mass of the solid content of the elastomer precursor in the aqueous dispersion. By setting the content to 0.1 parts by mass or more, preferably 0.5 parts by mass or more, and more preferably 1.0 parts by mass, it is possible to suppress deterioration of the elastomer that is uniformly present in the artificial leather and deteriorates over time in actual use. On the other hand, by setting the content to 5 parts by mass or less, more preferably 4 parts by mass or less, and still more preferably 2.5 parts by mass or less, the number of repeating units can be set to the above-described number, compatibility with the elastomer precursor can be improved, and inhibition of coagulation of the elastomer can be suppressed.

The viscosity of the aqueous dispersion containing the compound having an ethylene oxide skeleton is preferably 1,000 mPa·s or more and 10,000 mPa·s or less. When the viscosity is preferably 1,500 mPa·s or more, more preferably 1,800 mPa·s or more, migration can be suppressed. On the other hand, by setting the viscosity to 10,000 mPa·s or less, more preferably 9,000 mPa·s or less, the impregnation property of polyurethane can be improved.

(3) Elastomer

The elastomer in the artificial leather according to the present invention preferably contains polyether diol and/or polycarbonate diol as a constituent.

When the elastomer according to the present invention contains the polyether diol as a constituent, the elastomer precursor has a high degree of freedom of the ether bond, so that the elastomer has a low glass transition temperature and weak cohesive force, and thus has excellent flexibility. On the other hand, by containing polycarbonate diol as a constituent, an elastomer excellent in durability such as water resistance, heat resistance, and weather resistance can be obtained due to the high cohesive force of the carbonate group.

The elastomer used in the present invention appropriately retains fibers in the artificial leather, and is preferably present in the fibrous substrate from the viewpoint of providing at least one nap surface of the artificial leather, which is a preferable embodiment.

[Artificial Leather]

In the artificial leather of the present invention, it is important that the content of the compound having an ethylene oxide skeleton represented by the general formula (1) in the elastomer in the artificial leather is 0.1 parts by mass or more and 5 parts by mass or less. When the content in the elastomer is 0.1 parts by mass or more, preferably 0.3 parts by mass or more, it is possible to suppress deterioration of the elastomer that is uniformly present in the artificial leather and deteriorates over time in actual use. On the other hand, when the content in the elastomer is 5 parts by mass or less, preferably 4 parts by mass or less, the compound having an ethylene oxide skeleton exists with good compatibility with the elastomer precursor, and inhibition of coagulation of the elastomer can be suppressed.

The artificial leather of the present invention preferably has a longitudinal bending length of 40 mm or more and 150 mm or less as defined in "41.5° cantilever method" described in JIS L 1913: 2010 "General Nonwoven Fabric Test Method". By setting the bending length within the above range, moderate flexibility and repulsive feeling can be achieved. The bending length is preferably 50 mm or more, more preferably 55 mm or more from the viewpoint of obtaining an artificial leather having repulsive feeling, and is preferably 120 mm or less, more preferably 110 mm or less from the viewpoint of obtaining an artificial leather having the flexibility.

The vertical direction in the artificial leather of the present invention refers to a direction in which a nap raising is performed on the artificial leather. As a method for searching the direction in which the nap raising is performed, it is possible to appropriately adopt a method according to the constituents of the artificial leather, such as visual check when tracing with a finger or SEM photographing. That is, the direction in which the napped fibers can be laid or raised when being traced with a finger is the longitudinal direction. In addition, when the surface of the artificial leather traced with the finger is photographed by SEM, the direction in which the direction of the laid napped fibers is the largest is the longitudinal direction. On the other hand, a lateral direction in the artificial leather of the present invention refers to a direction perpendicular to the longitudinal direction.

The artificial leather of the present invention preferably has an abrasion loss of 30 mg or less in 50,000 Martindale abrasion tests defined in JIS L 1096: 2010 "Testing methods for woven and knitted fabrics" after an accelerated deterioration test (Jungle test, left in a room at 70° C. and 95% relative humidity for 2 weeks) in a high-temperature and high-humidity environment. By setting the abrasion loss after the accelerated deterioration test (jungle test) within the above range, deterioration of the elastomer can be suppressed even when used for a long period of time, and the appearance of the artificial leather can be maintained. The abrasion loss is preferably 25 mg or less, and more preferably 20 mg or less because deterioration of the appearance of the artificial leather can be suppressed.

[Method for Manufacturing Artificial Leather]

A method for manufacturing an artificial leather according to the present invention including impregnating a fibrous substrate made of ultrafine fiber-generating fibers and ultrafine fibers with an aqueous dispersion containing an elastomer precursor having a hydrophilic group and 0.1 parts by mass or more and 5 mass % or less of a compound having an ethylene oxide skeleton represented by the general formula (1) with respect to 100 parts by mass of a solid content of the elastomer precursor; and coagulating the elastomer precursor. The details thereof will be described below.

<Step of Forming Fibrous Substrate>

In a preferred embodiment of the present invention, as a means for obtaining the ultrafine fibers, ultrafine fiber-generating fibers are used. A nonwoven fabric including the fiber bundle of ultrafine fibers entangled with one another can be obtained by preliminarily entangling ultrafine fiber-generating fibers to form a nonwoven fabric, and then making the fibers ultrafine.

As the ultrafine fiber-generating fibers, it is preferable to use a sea-island composite fiber in which two components (two or three components when the island is a core-sheath composite fiber) of thermoplastic resins having different solvent solubility are used as a sea component and an island component, and the sea component is dissolved and removed using a solvent or the like to form an island component as an ultrafine fiber, from the viewpoint of the texture and surface appearance of the base material for the artificial leather, because appropriate spaces can be added between the island components, that is, between the ultrafine fibers inside the fiber bundle when the sea component is removed.

As the sea-island composite fiber, a method for using a spinneret for a sea-island composite and using a polymer mutual array in which two components of a sea component and an island component (three components when the island is a core-sheath composite fiber) are arranged and spun is preferable from the viewpoint of obtaining ultrafine fibers having a uniform single fiber diameter.

As the sea component of the sea-island composite fiber, for example, a copolymerized polyester obtained by copolymerizing polyethylene, polypropylene, polystyrene, sodium sulfoisophthalic acid, polyethylene glycol or the like, and polylactic acid can be used, but polystyrene or copolymerized polyester is preferably used from the viewpoint of yarn making property, easy elutability, and the like.

It is preferable that the mass ratio between the sea component and the island component in the sea-island composite fibers used in the present invention be in a range of sea component:island component=10:90 to 80:20. When the mass ratio of the sea component is 10 mass % or more, the island component tends to be made sufficiently ultrafine. When the mass ratio of the sea component is 80 mass % or less, the proportion of the eluted component is small and the productivity is thus improved. The mass ratio between the sea component and the island component is more preferably in a range of the sea component:the island component=20:80 to 70:30.

In addition, the fibrous substrate preferably takes the form of a nonwoven fabric in which fibers are entangled, and can be used as a short fiber nonwoven fabric or a long fiber nonwoven fabric, as described above. However, when the fibrous substrate is a short fiber nonwoven fabric, the number of fibers facing the thickness direction of the artificial leather is larger than that of the long fiber nonwoven fabric, and a high degree of dense feeling can be obtained on the surface of the artificial leather at the time of nap raising, which is preferable.

If short fiber nonwoven fabric is used as the fibrous substrate, it is preferable for the obtained ultrafine fiber-generating fibers to be crimped and then cut to required length to provide raw stock. Generally known methods may be used for the crimping and cutting steps.

Then, the obtained raw stock is processed by, for example, a cross lapper to produce a fiber web, which is then subjected to fiber interlacing treatment to provide short fiber nonwoven fabric. As a method for interlacing fiber webs to obtain a short fiber nonwoven fabric, needle punching, water jet punching, or the like can be used.

Furthermore, the obtained short fiber nonwoven fabric and woven fabric are preferably stacked and interlaced and integrated. For the interlacing and integration of the short fiber nonwoven fabric and the woven fabric, the woven fabric is stacked on one surface or both surfaces of the short fiber nonwoven fabric, or the woven fabric is sandwiched between a plurality of short fiber nonwoven fabric webs, and then the fibers of the short fiber nonwoven fabric and the woven fabric are preferably interlaced by needle punching, water jet punching, or the like.

The apparent density of the short fiber nonwoven fabric including ultrafine fiber-generating fibers after needle punching or water jet punching is preferably 0.15 $g/cm^3$ or more and 0.45 $g/cm^3$ or less. An apparent density of preferably 0.15 $g/cm^3$ or more makes it possible to produce a fibrous substrate having a sufficiently high shape stability and dimensional stability. In addition, preferably, when the apparent density is 0.45 $g/cm^3$ or lower, a sufficient space can be kept such that the elastomer precursor is imparted.

From the viewpoint of compactness, the nonwoven fabric thus obtained may be contracted and further highly compacted by dry heat or wet heat or by both in a preferred embodiment. Further, the nonwoven fabric may be compressed in the thickness direction by calendaring or the like.

A sea-removing process for removing the sea component of the composite fibers in the case of using the sea-island composite fibers may be carried out before or/and after the aqueous dispersion containing the elastomer precursor having a hydrophilic group is imparted to the fibrous substrate. In a case where the sea-removing process is carried out before the aqueous dispersion is imparted, there is a tendency of forming a structure of the elastomer directly and tightly attached to the ultrafine fibers, causing the ultrafine fibers to be strongly retained. Thus, this allows the abrasion resistance of the artificial leather to be more favorable. When the sea-removing process is performed after imparting the aqueous dispersion, an appropriate space is formed between the ultrafine fiber and the elastomer, and the texture of the artificial leather tends to be flexible.

An ultrafine fiber-generating process (sea-removing process) in a case of using the sea-island composite fibers may be carried out by immersing the sea-island composite fibers in a solvent and by squeezing them. As the solvent for dissolving the sea component, it is possible to use an alkaline aqueous solution such as sodium hydroxide, or hot water.

In the ultrafine fiber-generating process, it is possible to use a machine such as a continuous dyeing machine, a vibro washer type sea remover, a jet dyeing machine, a wince dyeing machine, or a jigger dyeing machine.

On the other hand, an inhibitor such as a cellulose derivative or polyvinyl alcohol (hereinafter, sometimes abbreviated as PVA) are imparted to the fibrous substrate, and then the aqueous dispersion is imparted, whereby the adhesion between the fibrous substrates and the elastomer can be reduced, and a softer texture can be achieved.

The inhibitor may be added either before or after the sea-removing process of a fiber having an islands-in-the-sea structure. The inhibitor is imparted before the sea-removing process, so that the shape retention capacity of the fibrous substrate can be enhanced even when the basis weight of the fiber decreases and the tensile strength of the fibrous substrate decreases. Thus, a thin artificial leather can also be stably processed, and the thickness retention of the fibrous substrate in the step of the sea-removing process can be increased. Consequently, it is possible to prevent the fibrous substrate from being highly compacted. Meanwhile, the inhibitor is imparted after the sea-removing process, so that it is possible to allow the fibrous substrate to be highly compacted. Therefore, appropriate adjustment is preferably carried out according to the purpose.

As the inhibitor, PVA is preferably used because it has a high reinforcing effect on the fibrous substrate and is hardly eluted in water. Among the PVAs, high saponification value PVA that is more poorly soluble in water is used in a more preferred embodiment, from the viewpoint that it is possible to cause the inhibitor to be hardly eluted at the time of imparting the aqueous dispersion containing the elastomer precursor having a hydrophilic group, and inhibit the adhesion between the ultrafine fibers and the elastomer.

The high saponification value PVA has a saponification value of preferably 95% or more and 100% or less, and more preferably 98% or more and 100% or less. The saponification value is set to 95% or more, so that it is possible to reduce PVA elution at the time of imparting the aqueous dispersion containing the elastomer precursor having a hydrophilic group.

The polymerization degree of PVA is preferably 500 or more and 3,500 or less, and more preferably 500 or more and 2,000 or less. The PVA is set to 500 or more, so that it is possible to reduce the elution of PVA at the time of imparting the aqueous dispersion containing the elastomer precursor. The PVA is set to 3,500 or less, so that the viscosity of the PVA solution does not become excessively high, and it is possible to stably impart the high saponification value PVA to the fibrous substrate.

The amount of PVA imparted to the fibrous substrate with regard to the fiber mass of the fibrous substrate is 0.1 mass % or more and 50 mass % or less, and preferably 1 mass % or more and 45 mass % or less. The amount of PVA imparted is set to 0.1 mass % or more, so that it is possible to obtain a sheet-shaped article with favorable flexibility and texture. The amount of PVA imparted is set to 50 mass % or less, so that it is possible to obtain a sheet-shaped article with favorable processability and more favorable physical characteristics such as abrasion resistance.

<Imparting Step of Elastomer>

A method for manufacturing an artificial leather according to the present invention including impregnating a fibrous substrate made of ultrafine fiber-generating fibers and ultrafine fibers with an aqueous dispersion containing an elastomer precursor having a hydrophilic group and 0.1 parts by mass or more and 5 parts by mass or less of a compound having an ethylene oxide skeleton represented by the general formula (1) with respect to 100 parts by mass of a solid content of the elastomer precursor; and coagulating the elastomer precursor.

In the method for manufacturing an artificial leather of the present invention, the elastomer precursor having a hydrophilic group is imparted to the fibrous substrate.

In the method for manufacturing the artificial leather of the present invention, the elastomer precursor preferably contains polyether diol and/or polycarbonate diol as a constituent. The reason is as described in the section of (1-6) Configuration of elastomer precursor.

In the method for manufacturing an artificial leather of the present invention, a coagulation method usually used in the art such as a dry heat coagulation method or a coagulation in liquid method can be applied to the coagulation of the elastomer precursor, but in the dry heat coagulation method, a compound having an ethylene oxide skeleton tends to be easily separated from the coagulated elastomer due to a migration action accompanying evaporation of moisture during heating, and it is more preferable to use a coagulation in liquid method in which a compound having an ethylene oxide skeleton is easily included in the elastomer.

In a case of using the dry heat coagulation method, the aqueous dispersion is imparted to the fibrous substrate, and the resulting product is preferably dry-heat coagulated by heat treatment at a temperature of 120° C. or higher and 180° C. or lower so as to impart the elastomer precursor to the fibrous substrate.

As the coagulation in liquid method, an acid coagulation method in which a coagulation treatment is performed with a coagulation solvent having a pH of 1 or more and 3 or less, a hot water coagulation method in which a coagulation treatment is performed with hot water having a pH of 80° C. or higher and 100° C. or lower, or the like can be used.

In the case of using the acid coagulation method as the coagulation in liquid method, the pH of the coagulation solvent is adjusted to 1 or more, preferably 1.5 or more, whereby deterioration of the elastomer precursor can be prevented. When the pH is 3 or less, preferably 2.5 or less, coagulation of the elastomer precursor can be promoted. The liquid temperature of the coagulation solvent is preferably 20° C. or higher, more preferably 30° C. or higher, and still more preferably 40° C. or higher in order to promote coagulation of the elastomer precursor. In addition, in order to prevent deterioration of the elastomer precursor, the liquid temperature of the coagulation solvent is preferably 90° C. or lower, more preferably 80° C. or lower, and still more preferably 70° C. or lower. The type of the coagulation solvent is not particularly limited, but formic acid, sulfuric acid, and the like are preferably used from the viewpoint of ease of handling and the like.

The concentration of the elastomer precursor in the aqueous dispersion (content of the elastomer precursor in 100 parts by mass of the aqueous dispersion) is preferably 10 parts by mass or more and 50 parts by mass or less, and more preferably 15 parts by mass or more and 40 parts by mass or less, from the viewpoint of storage stability of the aqueous dispersion.

In order to improve the storage stability and film-forming potential, the content of aqueous organic solvent in the aqueous dispersion used in the present invention may be 40 parts by mass or less in 100 parts by mass of the aqueous dispersion. The content of the aqueous organic solvent is preferably 1 part by mass or less in view of protecting a film-forming environment.

In the method for manufacturing an artificial leather of the present invention, when the dry heat coagulation method is used, an inorganic salt can be contained in the aqueous dispersion. The inorganic salt is contained, thereby making it possible to impart thermosensitive coagulability to the aqueous dispersion. In the present invention, the thermosensitive coagulability refers to a property of decreasing fluidity of the aqueous dispersion and coagulating the aqueous dispersion after a certain temperature (thermal coagulation temperature) is reached at the time of heating the aqueous dispersion.

In a case of using the dry heat coagulation method, if the elastomer precursor does not have thermosensitive coagulability, migration occurs in which the elastomer precursor migrates to the sheet surface along with evaporation of moisture. Further, coagulation proceeds in a state in which the elastomer precursor is unevenly distributed around the fiber as moisture evaporates, whereby the elastomer covers the periphery of the fiber and strongly restricts the movement. As a result, the texture of the artificial leather becomes significantly hard.

In the method for manufacturing an artificial leather of the present invention, it is preferable that the aqueous dispersion contains a crosslinking agent. By introducing the three-dimensional network structure into the elastomer by the crosslinking agent, physical properties such as abrasion resistance can be improved.

When the concentration of the crosslinking agent in the aqueous dispersion is 1 part by mass or more, more preferably 2 parts by mass or more with respect to 100 parts by mass of the elastomer precursor, a three-dimensional network structure can be more introduced into the elastomer by the crosslinking agent, and an artificial leather excellent in abrasion resistance and the like can be obtained. In addition, by setting the concentration of the crosslinking agent to 10 parts by mass or less, more preferably 7 parts by mass or less with respect to 100 parts by mass of the elastomer precursor, when the elastomer is formed, it is possible to suppress the excessive crosslinking agent from inhibiting the coagulation of the elastomer precursor, and it is easy to suppress deterioration of physical properties such as abrasion resistance.

In addition, the crosslinking agent according to the method for manufacturing an artificial leather of the present invention is preferably a carbodiimide-based crosslinking agent and/or a blocked isocyanate crosslinking agent. A three-dimensional crosslinked structure by N-acylurea bond and/or isourea bond, which is excellent in the physical properties, such as light resistance, heat resistance, and abrasion resistance, and flexibility, can be imparted into the molecule of the elastomer in the artificial leather by a crosslinking agent, and the physical properties such as durability and abrasion resistance can be dramatically improved while maintaining the flexibility of the artificial leather.

In the method for manufacturing an artificial leather of the present invention, the aqueous dispersion preferably contains a compound having an ethylene oxide skeleton represented by the general formula (1). The compound having an ethylene oxide skeleton represented by the general formula (1) can adjust the viscosity of the later-described aqueous dispersion liquid, and can suppress a migration phenomenon in which the elastomer precursor migrates to the sheet surface along with evaporation of moisture.

In the present invention, in addition to the compound having an ethylene oxide skeleton of the general formula (1), a thickener can also be used in combination. The "thickener" can adjust the viscosity of the aqueous dispersion by being contained in the aqueous dispersion, and as such a thickener, a nonionic thickener, an anionic thickener, a cationic thickener, or a zwitterionic-based thickener can be applied.

The type of the thickener as described above can be selected from an associative thickener and an aqueous polymeric thickener.

As the associative thickener, a urethane-modified compound, an acryl-modified compound, a copolymerized compound thereof, or the like can be applied.

Examples of the aqueous polymeric thickener include a natural polymer compound, a semi-synthetic polymer compound, and a synthetic polymer compound.

Examples of the natural polymer compound include nonionic compounds such as tamarind gum, guar gum, rost bean gum, tragacanth gum, starch, dextrin, gelatin, agarose, casein, and curdlan, anionic compounds such as xanthan gum, carrageenan, gum arabic, pectin, collagen, sodium chondroitin sulfate, sodium hyaluronate, carboxymethyl starch, and starch phosphate, and cationic compounds such as cationic starch and chitosan.

Examples of the semi-synthetic polymer compound include nonionic compounds such as methyl cellulose, ethyl cellulose, hydroxyethyl cellulose, ethyl hydroxyethyl cellulose, methyl hydroxypropyl cellulose, soluble starch, and methyl starch, and anionic compounds such as carboxymethyl cellulose, carboxymethyl starch, and alginate.

Examples of the synthetic polymer compound include nonionic compounds such as polyvinyl alcohol, polyacrylamide, polyvinyl pyrrolidone, polymethyl vinyl ether, polyethylene glycol, and polyisopropyl acrylamide; anionic compounds such as carboxyvinyl polymer, sodium polyacrylate, and sodium polystyrene sulfonate; and cationic compounds such as dimethylaminoethyl (meth)acrylate quaternary salt, dimethyldiallylammonium chloride, polyamidine, polyvinylimidazoline, and polyethyleneimine.

In the method for manufacturing an artificial leather of the present invention, an elastomer precursor may be imparted to a fibrous substrate, solidified, and then subjected to a curing treatment. The heating temperature in the curing treatment by drying is 120° C. or higher and 180° C. or lower. The temperature is preferably 140° C. or higher, and more preferably 145° C. or higher for enhancing the effect of the curing treatment and improving physical properties such as durability and abrasion resistance. In order to suppress thermal deterioration of the elastomer, the temperature is preferably 175° C. or lower, and more preferably 170° C. or lower.

<Finishing Step>

The method for manufacturing an artificial leather of the present invention preferably includes a dyeing step of dyeing an artificial leather. As the dyeing treatment, it is possible to adopt various methods usually used in the field, and examples thereof include a jet dyeing treatment using a jigger dyeing machine or a jet dyeing machine, dip dyeing treatment such as thermosol dyeing treatment using a continuous dyeing machine, and printing treatment to the napped surface, such as roller printing, screen printing, inkjet printing, sublimation printing, and vacuum sublimation printing. Among them, it is preferable to use a jet dyeing machine because it is possible to soften the non-nap raised artificial leather or the artificial leather by giving a kneading effect simultaneously with dyeing of the non-nap raised artificial leather or the artificial leather. If necessary, the artificial leather may be subjected to various kinds of resin finishing after the dyeing.

The dye used in the present invention is not particularly limited as long as the dye is appropriately selected depending on the type of the fibers constituting the fibrous substrate. For example, when the fibers are polyester-based fibers, a disperse dye can be used. When the fibers are polyamide-based fibers, an acid dye, a premetallized dye, or a combination thereof can be used. When the sheet material is dyed with the disperse dye, the sheet material may be subjected to reduction cleaning after the dyeing.

It is also preferable to use a dyeing auxiliary at the time of dyeing. The dyeing auxiliary is used, so that the evenness and reproducibility of dyeing can be improved. The fiber may be further subjected to finishing agent treatment using a softening agent such as silicone, an antistatic agent, a water repellent agent, a flame retardant, a light resisting agent, an antibacterial agent or the like in the same bath as that used for the dyeing or after the dyeing.

In the present invention, regardless of before or after the dyeing step, from the viewpoint of manufacturing efficiency, it is also a preferable aspect to half-cut in the thickness direction.

The method for manufacturing an artificial leather of the present invention also preferably includes a nap raising step before and after the dyeing step. The method for forming the nap is not particularly limited, and various methods usually performed in the art such as buffing with sandpaper or the like can be used. When the length of the nap is too short, it is difficult to obtain an elegant appearance, and when the length of the nap is too long, pilling tends to occur. Therefore, the length of the nap is preferably 0.2 mm or more and 1.0 mm or less.

When the nap raising treatment is imparted, a lubricant such as a silicone emulsion can be added to the surface of the artificial leather before the nap raising treatment. In addition, when an antistatic agent is applied before the nap raising treatment, a ground powder generated from the artificial leather by grinding is less likely to deposit on sandpaper. In this way, an artificial leather is formed.

Furthermore, in one aspect of the present invention, the surface can be provided with designability as necessary. For example, the surface may be subjected to post processing including boring such as perforation, embossing, laser processing, pinsonic processing, and printing processing.

EXAMPLES

Next, the artificial leather of the present invention will be described more specifically using Examples, but the present invention is not limited only to these Examples.

[Evaluation Method]

(1) Flexibility Evaluation of Artificial Leather

Based on "41.5° cantilever method" described in 6.7.3 of "Stiffness" in 6.7 described in JIS L 1913: 2010 "General Nonwoven Fabric Test Method", 6 test pieces each having a size of 25 mm×250 mm in the longitudinal direction were prepared, the test pieces were placed on a horizontal table having an inclined surface with an angle of 41.5°, a scale when the center point of one end of the test piece was in contact with the inclined surface by sliding the test pieces was read, and an average value of the bending lengths of the 6 test pieces was determined.

(2) Accelerated Deterioration Test of Artificial Leather

As an accelerated deterioration test, an accelerated deterioration test (jungle test) was conducted in which an artificial leather of 10 cm square was allowed to stand in a space of 70° C. and a relative humidity of 95% for 2 weeks using "PR-2J" manufactured by ESPEC Corp.

(3) Evaluation of Abrasion of Artificial Leather

Evaluation of abrasion was performed based on JIS L 1096: 2010. "Model 406", manufactured by James H. Heal & Co. Ltd., was used as a Martindale abrasion tester, and "ABRASTIVE CLOTH SM 25", manufactured by James H. Heal & Co. Ltd., was used as a standard friction cloth. A load of 12 kPa was applied to the artificial leather after the accelerated deterioration test, and the number of times of abrasion was set to 50,000 times. The mass of the artificial leather before and after abrasion was used, and the abrasion loss was calculated by the following equation.

Abrasion loss (mg)=mass before abrasion (mg)−mass after abrasion (mg)

As the abrasion loss, a value obtained by rounding off the first decimal place was taken as the abrasion loss.

(4) Content of Compound Having Ethylene Oxide Skeleton

An artificial leather was immersed in N,N-dimethylformamide overnight, and a solution from which an elastomer and a compound having an ethylene oxide skeleton had been eluted was concentrated by heating and drying at 140° C. for coagulation. Toluene at 25° C. was added to the obtained solid, and only the compound having an ethylene oxide skeleton was eluted. The solution containing the compound having an ethylene oxide skeleton was heated and dried, and then the amount of the compound having an ethylene oxide skeleton with respect to 100 parts by mass of the elastomer was measured.

(5) Viscosity of Aqueous Dispersion Containing Compound Having Ethylene Oxide Skeleton An aqueous dispersion containing the prepared elastomer precursor and a compound having an ethylene oxide skeleton was measured at a liquid temperature of 25° C. according to JIS K 7117-1 (1999).

[Method for Manufacturing Nonwoven Fabric a for Fibrous Substrate]

A copolymerized polyester containing 8 mol % SSIA (sodium 5-sulfoisophthalate) was used as a sea component, and polyethylene terephthalate was used as an island component to obtain sea-island composite fibers with an average single fiber diameter of 20 μm in which the composite ratio of the sea component:the island component was 43 mass %:57 mass % and the number of islands was 16 islands/1 filament. The obtained sea-island composite fibers were cut into a fiber length of 51 mm to obtain a staple, which went through a carding machine and a cross wrapper to form a fiber web. This fiber web was subjected to needle punching to manufacture a nonwoven fabric with a basis weight of 550 g/m 2 and a thickness of 3.0 mm. The nonwoven fabric thus obtained was immersed and contracted in hot water at a temperature of 98° C. for 2 minutes, and was then dried at a temperature of 100° C. for 5 minutes to obtain a nonwoven fabric A for fibrous substrate.

[Method for Manufacturing Nonwoven Fabric B for Fibrous Substrate]

A copolymerized polyester containing 8 mol % SSIA (sodium 5-sulfoisophthalate) was used as a sea component, and polyethylene terephthalate was used as an island component to obtain sea-island composite fibers with an average single fiber diameter of 28.9 μm in which the composite ratio of the sea component:the island component was 43 mass %:57 mass % and the number of islands was 16 islands/1 filament. The obtained sea-island composite fibers were cut into a fiber length of 51 mm to obtain a staple, which went through a carding machine and a cross wrapper to form a fiber web. This fiber web was subjected to needle punching to manufacture a nonwoven fabric with a basis weight of 550 g/m $^2$ and a thickness of 3.0 mm. The nonwoven fabric thus obtained was immersed and contracted in hot water at a temperature of 98° C. for 2 minutes, and was then dried at a temperature of 100° C. for 5 minutes to obtain a nonwoven fabric B for fibrous substrate.

[Method for Manufacturing Elastomer Precursor A]

A prepolymer was prepared in an acetone solvent using polyhexamethylene carbonate having the number average molecular weight (Mn) of 2,000 as polymeric polyol, dicyclohexylmethane-4,4'-diisocyanate (hydrogenated MDI) as an organic diisocyanate, and a diol compound having polyethylene glycol in a side chain, and 2,2-dimethylol propionic acid as an active hydrogen component-containing compound having a hydrophilic group. Ethylene glycol and ethylenediamine as chain extenders and water were added, and the mixture was stirred. Acetone was removed under reduced pressure to obtain an aqueous dispersion of an elastomer precursor A.

Example 1

(Step of Forming Fibrous Substrate)

The nonwoven fabric A for fibrous substrate was impregnated with an aqueous solution containing 10 mass % of PVA ("NM-14", manufactured by Nippon Chemical Industrial CO., LTD.) with a saponification value of 99% and a polymerization degree of 1400, and heated and dried at a temperature of 140° C. for 10 minutes to obtain a PVA-imparted sheet in which the amount of PVA imparted per fiber mass of the nonwoven fabric for fibrous substrate was 30 mass %.

The obtained PVA-imparted sheet was immersed and treated for 30 minutes in a sodium hydroxide aqueous solution that was heated to a temperature of 95° C. and was at a concentration of 8 g/L. Then, a fibrous substrate (PVA-imparted ultrafine fiber nonwoven fabric) made of ultrafine fibers, in which the sea component had been removed from the sea-island composite fibers, was obtained.

(Imparting Step of Elastomer)

A solid content of a compound having an ethylene oxide skeleton represented by the following general formula (3) (viscosity: 6,000 mPa·s, number average molecular weight: 2,000, number of repeating units of ethylene oxide skeleton (n): 50) was added in an amount of 1.5 parts by mass (in Table 1, the solid content of the compound having an ethylene oxide skeleton based on 100 parts by mass of the solid content of the elastomer precursor is abbreviated as "content in aqueous dispersion"), a solid content of a blocked isocyanate-based crosslinking agent ("IMPRAFIX 2794" manufactured by Covestro) was added in an amount of 5 parts by mass, and a solid content of an acrylic thickener was added in an amount of 3 parts by mass, based on 100 parts by mass of the solid content of the elastomer precursor A, so that the entire solid content was prepared to 19 mass % by water to obtain an aqueous dispersion containing an elastomer precursor and having a viscosity of 2,000 mPa·s. The PVA-imparted ultrafine fiber nonwoven fabric was impregnated with the aqueous dispersion, and then treated with a formic acid aqueous solution having a pH of 2.3 at 60° C. for 20 minutes to solidify the elastomer precursor A, and then subjected to a curing treatment (drying with hot air at a temperature of 160° C. for 20 minutes) to obtain an elastomer-imparted ultrafine fiber nonwoven fabric having a thickness of 2.00 mm and 50 parts by mass of an elastomer with respect to 100 parts by mass of ultrafine fibers of the PVA-imparted ultrafine fiber nonwoven fabric.

The obtained elastomer-imparted ultrafine fiber nonwoven fabric was submerged and treated for 10 minutes in water heated to 95° C. to obtain an artificial leather from which the imparted PVA had been removed.

[Chemical formula 6]

(3)

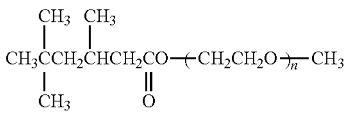

(Finishing Step)

The obtained artificial leather was cut in half in a direction perpendicular to the thickness direction. The side opposite to the half-cutting surface was subjected to grinding with an endless sandpaper of sandpaper No. 180 to obtain an artificial leather having a nap with a thickness of 0.75 mm.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 70 mm, and an abrasion loss of 15 mg after an accelerated deterioration test (jungle test), and had a soft texture and excellent durability. In addition, the content (in Table 1, it is abbreviated as "content in elastomer".) of the compound having an ethylene oxide skeleton in the elastomer in the artificial leather was 0.7 parts by mass with respect to 100 parts by mass of the elastomer. The results are shown in Table 1.

Example 2

The same procedure was carried out in the same manner as in Example 1, except that the content of the solid content of the compound having an ethylene oxide skeleton with respect to 100 parts by mass of the solid content of the elastomer precursor A, and the viscosity of the aqueous dispersion containing the elastomer precursor A were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 90 mm, and an abrasion loss of 20 mg after an accelerated deterioration test (jungle test), and had a soft texture and excellent durability. In addition, the content of the compound having an ethylene oxide skeleton in the elastomer in the artificial leather was 0.5 parts by mass with respect to 100 parts by mass of the elastomer. The results are shown in Table 1.

Example 3

The same procedure was carried out in the same manner as in Example 1, except that the content of the solid content of the compound having an ethylene oxide skeleton with respect to 100 parts by mass of the solid content of the elastomer precursor A, and the viscosity of the aqueous dispersion containing the elastomer precursor A were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 55 mm, and an abrasion loss of 28 mg after an accelerated deterioration test (jungle test), and had a soft texture and excellent durability. In addition, the content of the compound having an ethylene oxide skeleton in the elastomer in the artificial leather was 2.0 parts by mass with respect to 100 parts by mass of the elastomer. The results are shown in Table 1.

Example 4

The same procedure was carried out in the same manner as in Example 1, except that the solution viscosity and the number average molecular weight of the compound having an ethylene oxide skeleton when dissolved in water, the number of repeating units (n) of the ethylene oxide skeleton, and the content of the solid content of the compound having an ethylene oxide skeleton with respect to 100 parts by mass of the solid content of the elastomer precursor A were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 110 mm, and an abrasion loss of 25 mg after an accelerated deterioration test (jungle test), and had a soft texture and excellent durability. In addition, the content of the compound having an ethylene oxide skeleton in the elastomer in the artificial leather was 1.0 parts by mass with respect to 100 parts by mass of the elastomer. The results are shown in Table 1.

Example 5

The same procedure was carried out in the same manner as in Example 1, except that the solution viscosity and the number average molecular weight of the compound having an ethylene oxide skeleton when dissolved in water, the number of repeating units (n) of the ethylene oxide skeleton, and the viscosity of aqueous dispersion containing the elastomer precursor were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 120 mm, and an abrasion loss of 30 mg after an accelerated deterioration test (jungle test), and had a soft texture and excellent durability. In addition, the content of the compound having an ethylene oxide skeleton in the elastomer in the artificial leather was 0.9 parts by mass with respect to 100 parts by mass of the elastomer. The results are shown in Table 1.

Example 6

The same procedure was carried out in the same manner as in Example 1 except that the PVA-imparted ultrafine fiber nonwoven fabric was impregnated with the aqueous dispersion, and then the elastomer precursor A was subjected to dry heat coagulation by dry heat treatment with hot air at 120° C. for 20 minutes.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 120 mm, and an abrasion loss of 30 mg after an accelerated deterioration test (jungle test), and had a soft texture and excellent durability. In addition, the content of the compound having an ethylene oxide skeleton in the elastomer in the artificial leather was 0.2 parts by mass with respect to 100 parts by mass of the elastomer. The results are shown in Table 1.

Example 7

The same procedure was carried out in the same manner as in Example 1 except that nonwoven fabric B for fibrous substrate was used as nonwoven fabric for fibrous substrate.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 5.5 μm. The obtained artificial leather had a bending length of 100 mm, and an abrasion loss of 18 mg after an accelerated deterioration test (jungle test), and had a soft texture and excellent durability. In addition, the content of the compound having an ethylene oxide skeleton in the elastomer in the artificial leather was 0.7 parts by mass with respect to 100 parts by mass of the elastomer. The results are shown in Table 1.

Comparative Example 1

The same procedure was carried out in the same manner as in Example 1 except that the compound having an ethylene oxide skeleton was not added.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 160 mm, and an abrasion loss of 38 mg after an accelerated deterioration test (jungle test), and had a hard texture and poor durability. The results are shown in Table 2.

Comparative Example 2

The same procedure was carried out in the same manner as in Example 1, except that the content of the solid content of the compound having an ethylene oxide skeleton with respect to 100 parts by mass of the solid content of the elastomer precursor, and the viscosity of the aqueous dispersion containing the elastomer precursor A were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 190 mm, and an abrasion loss of 40 mg after an accelerated deterioration test (jungle test), and had a hard texture and poor durability. In addition, the content of the compound having an ethylene oxide skeleton in the elastomer in the artificial leather was 5.5 parts by mass with respect to 100 parts by mass of the elastomer. The results are shown in Table 2.

Comparative Example 3

The same procedures were carried out in the same manner as in Example 1, except that the content of the solid content of the compound having an ethylene oxide skeleton based on 100 parts by mass of the solid content of the elastomer precursor A, the solution viscosity and the number average molecular weight of the compound having an ethylene oxide skeleton when dissolved in water, the number of repeating units (n) of the ethylene oxide skeleton, and the viscosity of the aqueous dispersion containing the elastomer precursor A were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 170 mm, and an abrasion loss of 33 mg after an accelerated deterioration test (jungle test), and had a hard texture and poor durability. In addition, the content of the compound having an ethylene oxide skeleton in the elastomer in the artificial leather was 1.5 parts by mass with respect to 100 parts by mass of the elastomer. The results are shown in Table 2.

Comparative Example 4

The same procedures were carried out in the same manner as in Example 1, except that the content of the solid content of the compound having an ethylene oxide skeleton based on 100 parts by mass of the solid content of the elastomer precursor A, the solution viscosity and the number average molecular weight of the compound having an ethylene oxide skeleton when dissolved in water, the number of repeating units (n) of the ethylene oxide skeleton, and the viscosity of the aqueous dispersion containing the elastomer precursor A were changed.

The obtained artificial leather having a nap was dyed with a black dye by using a jet dyeing machine under conditions at a temperature of 120° C. Then, drying was performed with a dryer to obtain an artificial leather having ultrafine fibers with an average single fiber diameter of 3.8 μm. The obtained artificial leather had a bending length of 220 mm, and an abrasion loss of 50 mg after an accelerated deterioration test (jungle test), and had a hard texture and poor durability. In addition, the content of the compound having an ethylene oxide skeleton in the elastomer in the artificial leather was 0.6 parts by mass with respect to 100 parts by mass of the elastomer. The results are shown in Table 2.

TABLE 1-1

| | Example 1 | Example 2 | Example 3 | Example 4 |
|---|---|---|---|---|
| Viscosity of aqueous dispersion (mPa · s) | 2000 | 1800 | 4500 | 2000 |
| Nonwoven fabric for fibrous substrate | A | A | A | A |

TABLE 1-1-continued

| | | Example 1 | Example 2 | Example 3 | Example 4 |
|---|---|---|---|---|---|
| Coagulation method | | Acid coagulation method | Acid coagulation method | Acid coagulation method | Acid coagulation method |
| Compound having ethylene oxide skeleton | Solution viscosity when dissolved in water (mPa · s) | 6000 | 6000 | 6000 | 3000 |
| | Number average molecular weight (—) | 2000 | 2000 | 2000 | 900 |
| | Number of repetitions of ethylene oxide skeleton (—) | 50 | 50 | 50 | 20 |
| | Content in aqueous dispersion (parts by mass) | 1.5 | 1.0 | 5.0 | 3.0 |
| | Content in elastomer (parts by mass) | 0.7 | 0.5 | 2.0 | 1.0 |
| Bending length (mm) | | 70 | 90 | 55 | 110 |
| Abrasion loss after accelerated deterioration test (Jungle test) (mg) | | 15 | 20 | 28 | 25 |

TABLE 1-2

| | | Example 5 | Example 6 | Example 7 |
|---|---|---|---|---|
| Viscosity of aqueous dispersion (mPa · s) | | 4000 | 2000 | 2000 |
| Nonwoven fabric for fibrous substrate | | A | A | B |
| Coagulation method | | Acid coagulation method | Dry heat coagulation method | Acid coagulation method |
| Compound having ethylene oxide skeleton | Solution viscosity when dissolved in water (mPa · s) | 10000 | 6000 | 6000 |
| | Number average molecular weight (—) | 4000 | 2000 | 2000 |

TABLE 1-2-continued

| | | Example 5 | Example 6 | Example 7 |
|---|---|---|---|---|
| | Number of repetitions of ethylene oxide skeleton (—) | 150 | 50 | 50 |
| | Content in aqueous dispersion (parts by mass) | 1.5 | 1.5 | 1.5 |
| | Content in elastomer (parts by mass) | 0.9 | 0.2 | 0.7 |
| Bending length (mm) | | 120 | 120 | 100 |
| Abrasion loss after accelerated deterioration test (Jungle test) (mg) | | 30 | 30 | 18 |

TABLE 2

| | | Comparative Example 1 | Comparative Example 2 | Comparative Example 3 | Comparative Example 4 |
|---|---|---|---|---|---|
| Viscosity of aqueous dispersion (mPa · s) | | 1000 | 5000 | 1500 | 6000 |
| Nonwoven fabric for fibrous substrate | | A | A | A | A |
| Coagulation method | | Acid coagulation method | Acid coagulation method | Acid coagulation method | Acid coagulation method |
| Compound having ethylene oxide skeleton | Solution viscosity when dissolved in water (mPa · s) | — | 6000 | 2500 | 15000 |
| | Number average molecular weight (—) | — | 2000 | 400 | 12000 |

TABLE 2-continued

| | Comparative Example 1 | Comparative Example 2 | Comparative Example 3 | Comparative Example 4 |
|---|---|---|---|---|
| Number of repetitions of ethylene oxide skeleton (—) | — | 50 | 8 | 250 |
| Content in aqueous dispersion (parts by mass) | — | 12.0 | 4.0 | 1.0 |
| Content in elastomer (parts by mass) | — | 5.5 | 1.5 | 0.6 |
| Bending length (mm) | 160 | 190 | 170 | 220 |
| Abrasion loss after accelerated deterioration test (Jungle test) (mg) | 38 | 40 | 33 | 50 |

INDUSTRIAL APPLICABILITY

The artificial leather obtained according to the present invention is suitable as interior materials having a very elegant appearance, such as surface materials of furniture, chairs, walls, seats in vehicles including automobiles, trains, and aircrafts, ceiling, and interior decoration; clothing materials, such as shirts, jackets, upper and trim and the like of shoes including casual shoes, sports shoes, men's shoes and ladies' shoes, bags, belts, wallets, and a part of them; and industrial materials such as wiping cloth, abrasive cloth and CD curtains.

The invention claimed is:

1. An artificial leather comprising:

a fibrous substrate formed of ultrafine fibers having an average single fiber diameter of 0.1 μm or more and 10 μm or less; and an elastomer, wherein the elastomer contains a compound having a hydrophilic group and a compound having an ethylene oxide skeleton represented by general formula (1) as below, and a content of the compound having the ethylene oxide skeleton in the elastomer of the artificial leather is 0.1 parts by mass or more and 5 parts by mass or less per 100 parts by mass of the elastomer,

[Chemical formula 1]

$$R^1 \text{-}(\text{-}CH_2CH_2\text{-})_n\text{-} R^2 \qquad (1)$$

wherein $R^1$ and $R^2$ are functional groups having 1 to 20 carbon atoms, and n represents the number of repeating units of 10 or more and 200 or less, wherein $R^1$ in the general formula (1) is a functional group having an ester bond represented by general formula (2),

[Chemical formula 2]

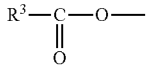

(2)

wherein $R^3$ is a functional group containing a terminal group selected from the group consisting of an isopropyl group, a tert-butyl group, and a mesityl group.

2. A method for manufacturing the artificial leather described in claim 1, the method comprising:

impregnating a fibrous substrate made of ultrafine fiber-generating fibers and ultrafine fibers with an aqueous dispersion containing an elastomer precursor having a hydrophilic group and 0.1 parts by mass or more and 5 parts by mass or less of a compound having an ethylene oxide skeleton represented by the general formula (1) with respect to 100 parts by mass of a solid content of the elastomer precursor; and coagulating the elastomer precursor.

3. The method for manufacturing an artificial leather according to claim 2, wherein the viscosity of the aqueous dispersion is 1000 mPa·s or more and 10,000 mPa· s or less.

* * * * *